(12) United States Patent
Chen et al.

(10) Patent No.: US 11,800,236 B2
(45) Date of Patent: Oct. 24, 2023

(54) DEVICE AND METHOD FOR IMAGE CAPTURING

(71) Applicant: CHICONY ELECTRONICS CO., LTD., New Taipei (TW)

(72) Inventors: Chien-Yueh Chen, New Taipei (TW); Jin-Kae Jang, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 0 days.

(21) Appl. No.: 17/748,879

(22) Filed: May 19, 2022

(65) Prior Publication Data

US 2023/0209208 A1 Jun. 29, 2023

(30) Foreign Application Priority Data

Dec. 29, 2021 (TW) .................................. 110149483

(51) Int. Cl.
*H04N 23/74* (2023.01)
*H04N 23/56* (2023.01)
*H04N 23/61* (2023.01)

(52) U.S. Cl.
CPC ............. *H04N 23/74* (2023.01); *H04N 23/56* (2023.01); *H04N 23/61* (2023.01)

(58) Field of Classification Search
CPC ......... H04N 23/74; H04N 23/56; H04N 23/61
See application file for complete search history.

(56) References Cited

U.S. PATENT DOCUMENTS

2021/0378073 A1* 12/2021 Lee ........................ H05B 45/20

* cited by examiner

*Primary Examiner* — Twyler L Haskins
*Assistant Examiner* — Angel L Garces-Rivera
(74) *Attorney, Agent, or Firm* — Muncy, Geissler, Olds & Lowe, P.C.

(57) ABSTRACT

An image capturing device includes an image capturing module, a plurality of light emitting elements, and a processing module. The image capturing module captures an image of a field of view. The light emitting elements emit light that irradiates to the field of view, and form a plurality of speckle regions in the field of view, and the speckle regions are consecutively arranged in the field of view. The processing module is electrically connected to the image capturing module and the light emitting elements. The processing module receives the image of the field of view from the image capturing module. The processing module obtains a target position according to a target image, and adjusts brightness of the light emitting elements according to the target position.

18 Claims, 9 Drawing Sheets

Configure the light emitting elements, so that the light emitting elements emit light that irradiates to a field of view and form a plurality of speckle regions in the field of view, wherein two adjacent regions of the speckle regions partially overlap to form at least one reference fence having higher brightness ~S10

The image capturing module captures and transmits an image of the field of view to the processing module ~S20

The processing module obtains a target position according to a behavior of a target image crossing the reference fence ~S30

The processing module adjusts brightness of the light emitting elements according to the target position ~S40

DEVICE AND METHOD FOR IMAGE CAPTURING

BACKGROUND

1. Technical Field

The present disclosure relates to an image capturing device and method, and more particularly, to an image capturing device and method applied to day and night dual use.

2. Description of the Related Art

Generally, a day and night dual use camera (i.e., image capturing) device has an infrared radiation module and an infrared filter lens. In a day mode, the infrared filter lens is activated to block infrared light from entering a charge-coupled device (CCD) of a camera lens. In a night mode, the camera device radiates infrared light beams within the field of view and the infrared filter lens is deactivated, so that the camera lens receives infrared light reflected by an object or organism and then an image is formed.

However, due to restrictions of an infrared light intensity and coverage for a night image, it may be more difficult to assist in determining an exact position of the organism. Therefore, there is a need for a solution for improving the issues of over-exposure and occasional insufficient brightness caused by the lack of brightness enhancement of a specific region where the organism is located and the inability of brightness reduction of other non-focus areas.

SUMMARY

In view of the issues above, it is a primary object of the present disclosure to provide an image capturing device and method configured with a plurality of light emitting elements, so as to solve the issues of over-exposure or insufficient brightness in a night mode of a conventional day and night dual use image capturing device.

To achieve the object above, the present disclosure provides an image capturing device includes an image capturing module, a plurality of light emitting elements and a processing module. The image capturing module captures an image of a field of view. The light emitting elements emit light that irradiates to the field of view, and form a plurality of speckle regions in the field of view, wherein the speckle regions are consecutively arranged in the field of view. The processing module is electrically connected to the image capturing module and the light emitting elements. The processing module receives the image of the field of view from the image capturing module. The processing module obtains a target position according to a target image, and adjusts brightness of the light emitting elements according to the target position.

To achieve the object above, the present disclosure further provides an image capturing method applied to an image capturing device. The image capturing device includes an image capturing module, a plurality of light emitting elements and a processing module. The image capturing method includes the steps of: configuring the light emitting elements so that the light emitting elements emit light to a field of view, and forming a plurality of speckle regions in the field of view, wherein the speckle regions are consecutively arranged in the field of view; the image capturing module capturing and transmitting an image of the field of view to the processing module; the processing module obtaining a target position according to a target image; and the processing module adjusting brightness of the light emitting elements according to the target position.

According to an embodiment of the present disclosure, two adjacent regions of the speckle regions partially overlap to form at least one reference fence having higher brightness, and the processing module obtains the target position according to a behavior of the target image crossing the reference fence.

According to an embodiment of the present disclosure, the processing module increases brightness of one of the light emitting elements corresponding to the target position.

According to an embodiment of the present disclosure, each of the light emitting elements includes an infrared light emitting unit and a lens.

According to an embodiment of the present disclosure, the lens is a non-spherical lens.

According to an embodiment of the present disclosure, the light emitting elements are in a quantity of four, which are respectively a first light emitting element, a second light emitting element, a third light emitting element and a fourth light emitting element, and form a first speckle region, a second speckle region, a third speckle region and a fourth speckle region in the field of view, respectively. The first speckle region, the second speckle region, the third speckle region and the fourth speckle region are sequentially arranged in a long-axis direction of the field of view.

According to an embodiment of the present disclosure, the first light emitting element generates a first light cone range, the second light emitting element generates a second light cone range, the third light emitting element generates a third light cone range, and the fourth light emitting element generates a fourth light cone range. Off-axis angles of the first light cone range and the fourth light cone range are greater than off-axis angles of the second light cone range and the third light cone range.

According to an embodiment of the present disclosure, the first light cone range and the fourth light cone range face opposite directions, and the second light cone range and the third light cone range face opposite directions.

According to an embodiment of the present disclosure, aperture angles of the first light cone range and the fourth light cone range are greater than aperture angles of the second light cone range and the third light cone range.

According to an embodiment of the present disclosure, the first speckle region and the second speckle region partially overlap to form a first reference fence. The second speckle region and the third speckle region partially overlap to form a second reference fence. The third speckle region and the fourth speckle region partially overlap to form a third reference fence. The first reference fence, the second reference fence and the third reference fence are sequentially arranged in the long-axis direction of the field of view.

According to an embodiment of the present disclosure, the light emitting elements are in a quantity of six, which are respectively the first light emitting element, the second light emitting element, the third light emitting element, the fourth light emitting element, a fifth light emitting element and a sixth light emitting element. The fifth light emitting element and the sixth light emitting element form a fifth speckle region and a sixth speckle region on an outer side and an edge of the field of view, respectively. The fifth speckle region and the first speckle region partially overlap to form a fourth reference fence. The sixth speckle region and the fourth speckle region partially overlap to form a fifth reference fence.

As described above, according to the image capturing device and method of the present disclosure configured with the plurality of light emitting elements, the light emitting elements form a plurality of speckle regions in the field of view, and the speckle regions are consecutively arranged in the field of view. In other words, the plurality of light emitting elements illuminate the center and edge of the field of view in a partitioned manner. Moreover, after the processing module determines the target position, the processing module can also independently control the brightness of the light emitting elements corresponding to the speckle regions according to the target position, that is, brightness can be controlled in a partitioned manner so as to achieve effect of preventing over-exposure or insufficient brightness.

DETAILED DESCRIPTION OF THE EMBODIMENTS

In order to make the structure, characteristics, and effectiveness of the present disclosure further understood and recognized, a detailed description of the present disclosure is provided as follows, along with embodiments and accompanying figures.

Figure 1:
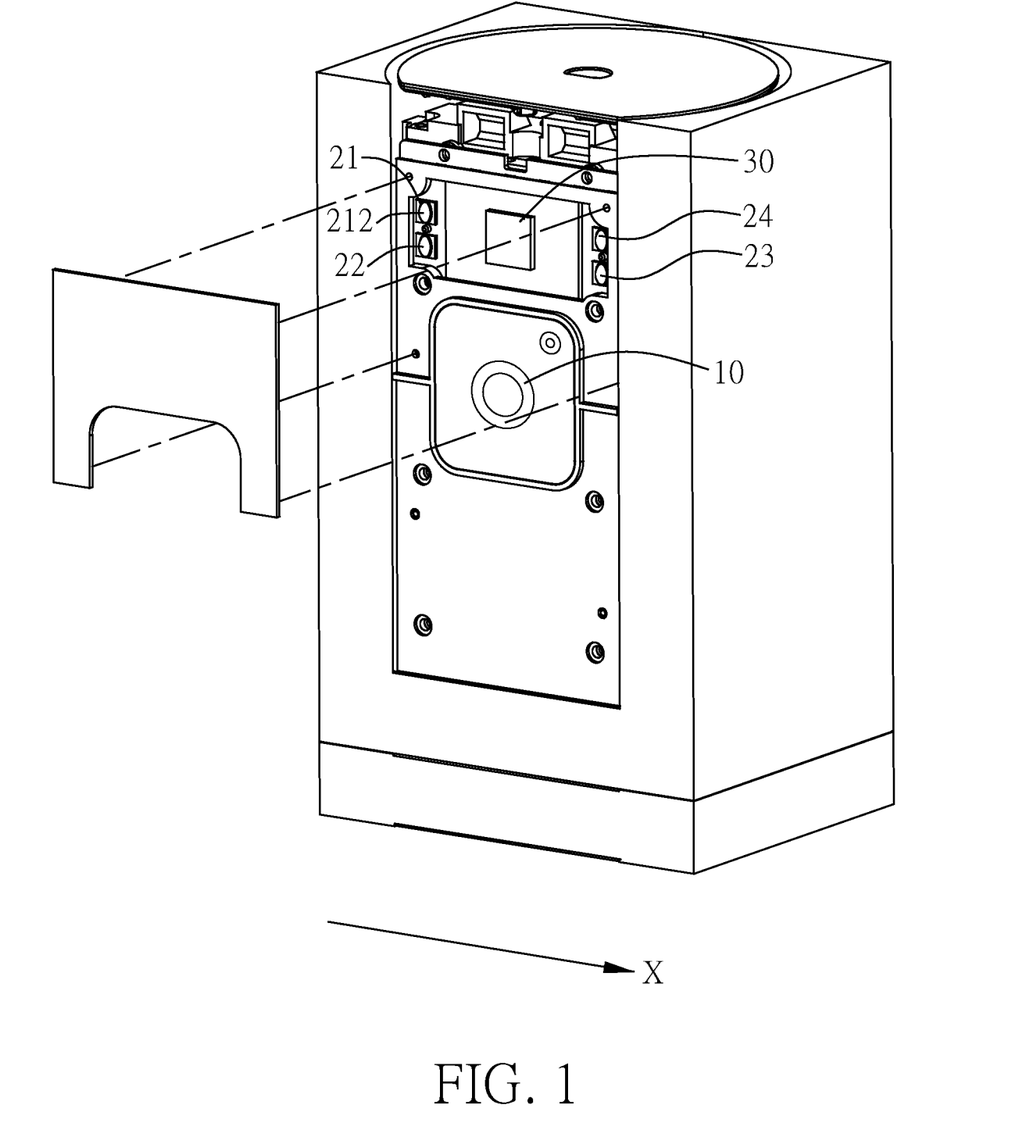
FIG. 1 is a schematic diagram of an image capturing device according to an embodiment of the present disclosure.
Figure 2:
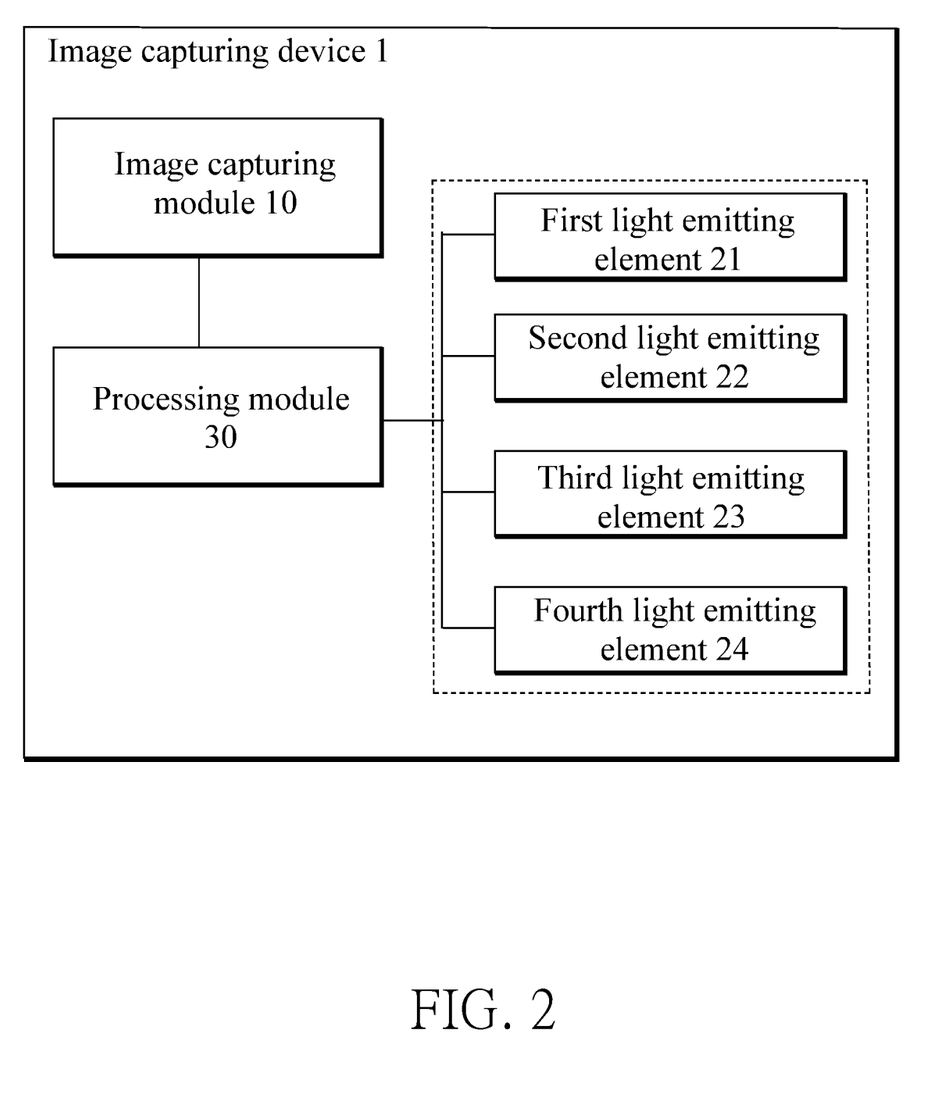
FIG. 2 is a block diagram of an image capturing device in FIG. 1.
Figure 3:
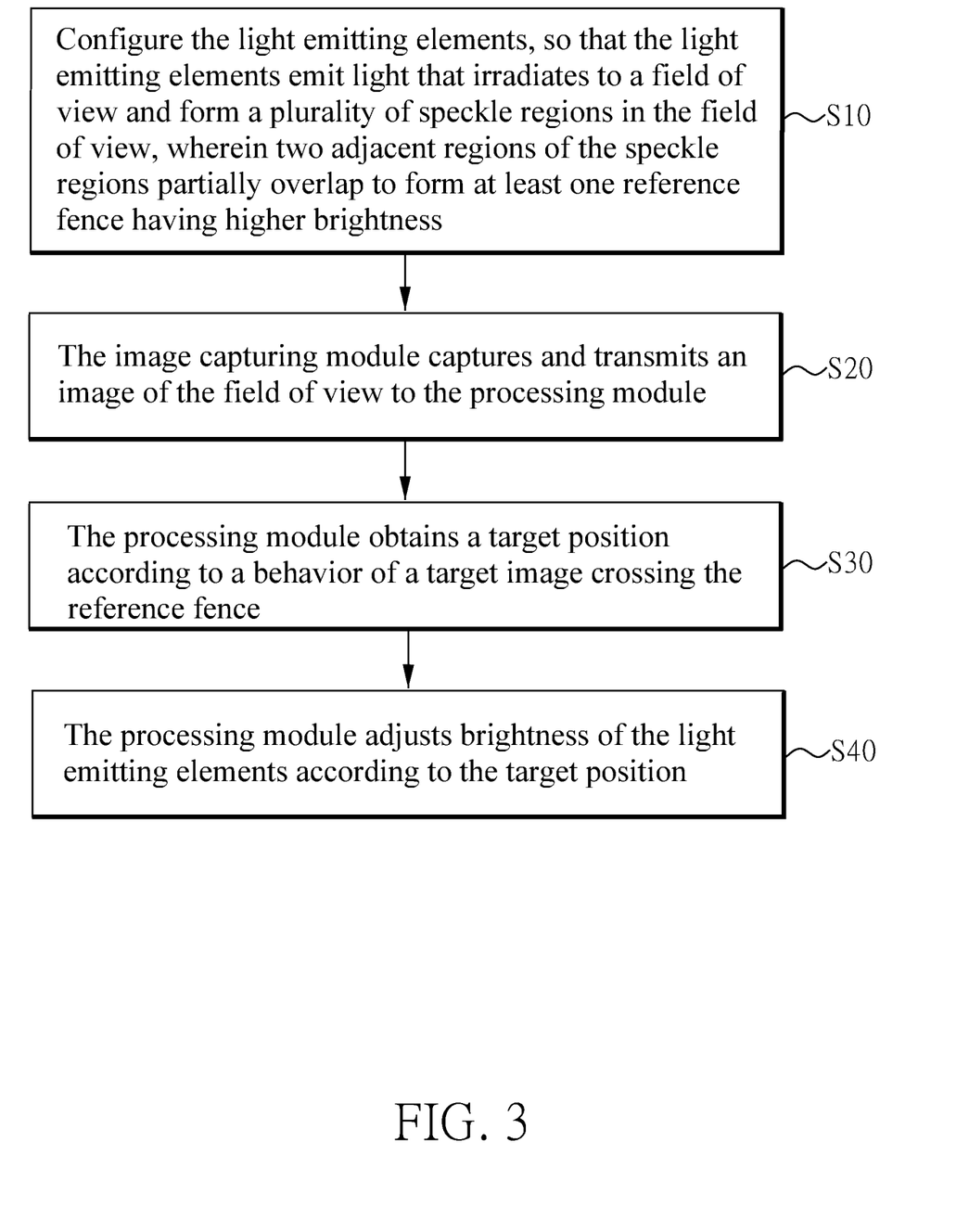
FIG. 3 is a flowchart of steps of an image capturing method according to an embodiment of the present disclosure.
Figure 4:
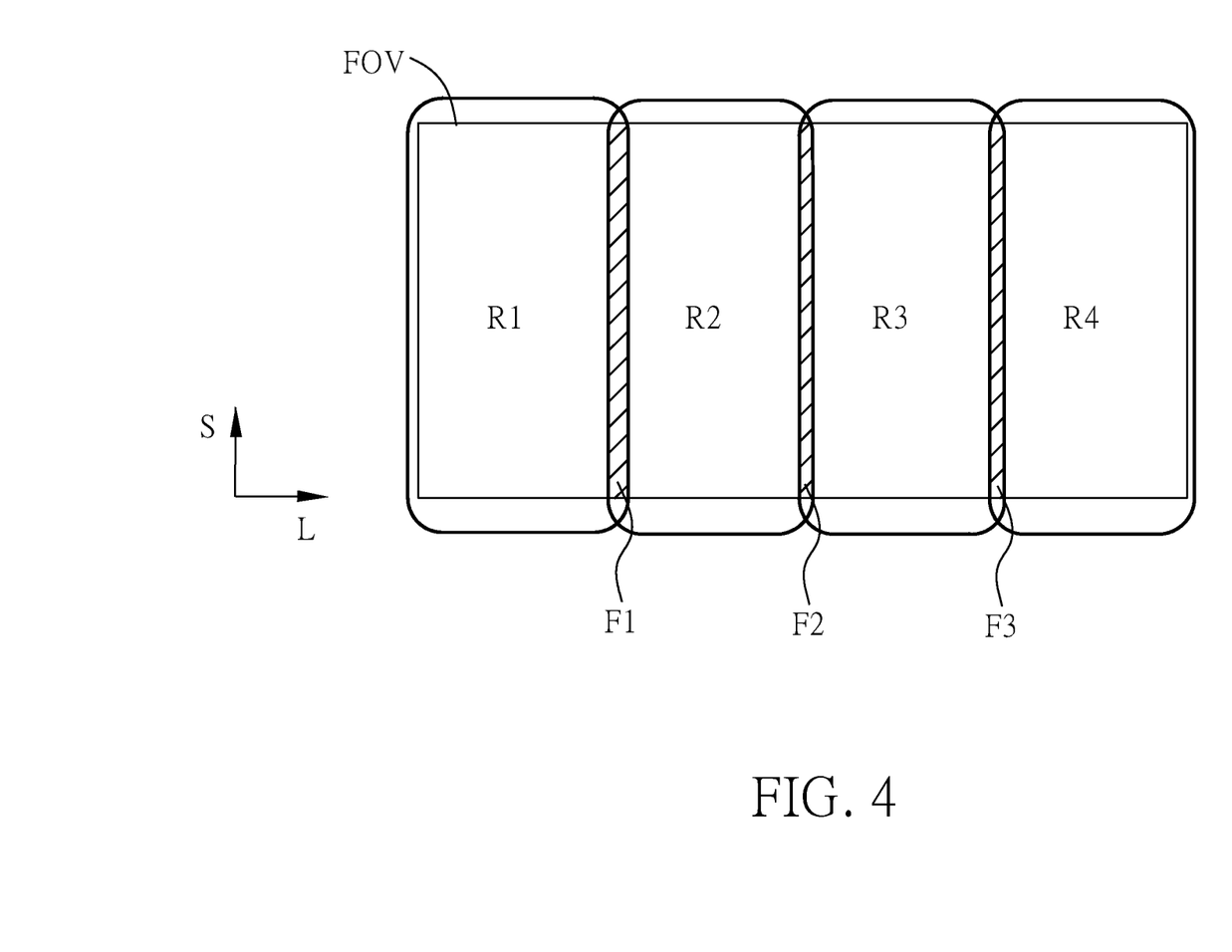
FIG. 4 is a schematic diagram of a field of view captured by the image capturing module in FIG. 1.

FIG. 1 shows a schematic diagram of an image capturing device according to an embodiment of the present disclosure. FIG. 2 shows a block diagram of an image capturing device in FIG. 1. FIG. 3 shows a flowchart of steps of an image capturing method according to an embodiment of the present disclosure. FIG. 4 shows a schematic diagram of a field of view captured by the image capturing module in FIG. 1. Refer to FIG. 1, FIG. 2, FIG. 3 and FIG. 4. First of all, an image capturing device 1 of this embodiment is a day and night dual use image capturing device, which can individually operate in a day mode and a night mode. Operation details of the image capturing device 1 in the night mode are described below.

In this embodiment, the image capturing device 1 includes an image capturing module 10, a plurality of light emitting elements and a processing module 30. The image capturing module 10 may comprise the components for image capturing or video recording, such as a lens or an image sensor. The image capturing module 10 is for capturing an image of a field of view FOV, as shown in FIG. 4. The image capturing device 1 includes four light emitting elements, for example; that is, the light emitting elements are in a quantity of four, which are respectively a first light emitting element 21, a second light emitting element 22, a third light emitting element 23 and a fourth light emitting element 24. The structure and function of the light emitting elements are to be described in detail shortly.

In this embodiment, the processing module 30 is electrically connected to the image capturing module 10 and the light emitting elements (that is, the first light emitting element 21, the second light emitting element 22, the third light emitting element 23 and the fourth light emitting element 24). The processing module 30 can receive the image of the field of view FOV from the image capturing module 10, and control the brightness of these light emitting elements, with associated details to be described shortly. In this embodiment, the processing module 30 may be, for example but not limited to, a digital signal processor (DSP) or a central processing unit (CPU).

It should be noted that, in addition to being configured as a hardware device, a software program, firmware, or a combination thereof, each of the modules above may also be configured as a circuit or a loop or other appropriate forms, and the connections between the modules are implemented by wired or wireless means so as to receive and transmit data. Moreover, in addition to being configured as independent units, the modules may also be configured in forms of being combined with one another. Moreover, this embodiment given as an example is merely a preferred embodiment of the present disclosure, and to keep the description succinct, the description does not contain all possible variations and combinations. However, a person skilled in the art could understand that not all the modules or elements above are essential. Further, in order to implement the present disclosure, other more detailed conventional modules or elements may be included. The modules or elements may be omitted or modified according to requirements, and other additional module or element may be present between two modules.

With reference to the process steps of an image capturing method in FIG. 3, the configuration of the light emitting elements as well as the operations of the image capturing module 10 and the processing module 30, and how they achieve the functions of the present disclosure are further described.

In step S10, the light emitting elements are configured so that the light emitting elements emit light that irradiates to the field of view FOV, and form a plurality of speckle regions in the field of view FOV, wherein two adjacent regions of the speckle regions partially overlap to form at least one reference fence having higher brightness.

In this embodiment, a speckle region refers to an illuminated region formed in the field of view FOV by the light emitted by the light emitting elements, and may also be referred to as a speckle illuminated region. The field of view FOV is a capturing range of the image capturing module 10. In this embodiment, with the first light emitting element 21, the second light emitting element 22, the third light emitting element 23 and the fourth light emitting element 24 configured, a first speckle region R1, a second speckle region R2, a third speckle region R3 and a fourth speckle region R4 are respectively formed in the field of view FOV, as shown in FIG. 4. Specifically, the light emitted by the first light emitting element 21 irradiates to the field of view FOV (as indicated by the bold block on the leftmost side in FIG. 4) to form the first speckle region R1. The light emitted by the second light emitting element 22 irradiates to the field of view FOV (as indicated by the bold block on the middle-left in FIG. 4) to form the second speckle region R2. The light emitted by the third light emitting element 23 irradiates to the field of view FOV (as indicated by the bold block on the middle-right in FIG. 4) to form the third speckle region R3. The light emitted by the fourth light emitting element 24 irradiates to the field of view FOV (as indicated by the bold block on the rightmost side in FIG. 4) to form the fourth speckle region R4.

The speckle regions are consecutively arranged in the field of view FOV. That is, two adjacent regions of the speckle regions are connected to each other, so as to illuminate the center and an edge of the field of view FOV in a partitioned manner. Preferably, in this embodiment, two adjacent regions of the speckle regions partially overlap to form at least one reference fence having higher brightness. For example, the first speckle region R1 and the second speckle region R2 partially overlap to form a first reference fence F1. The second speckle region R2 and the third speckle region R3 partially overlap to form a second reference fence F2. The third speckle region R3 and the fourth speckle region R4 partially overlap to form a third reference fence F3. It should be noted that, in this embodiment, the reference fence refers to a virtual fence and is an area where two adjacent speckle regions overlap, and thus the brightness of this area (that is, the reference fence) is higher. In step S20 that follows, the processing module 30 may determine a position of an organism according to characteristics of brightness difference.

Generally, a captured image (that is, the field of view FOV) has a common aspect ratio of 16:9, and a human body often moves along a long-axis direction L of the field of view FOV in the captured image. Preferably, the reference fence in this embodiment is a short-axis direction S parallel to the field of view FOV, so that the configuration of the reference fence conforms to a movement pattern of an organism (in particular, a human body). Specifically, the first speckle region R1, the second speckle region R2, the third speckle region R3 and the fourth speckle region R4 are sequentially arranged in the long-axis direction L of the field of view FOV, so that the first reference fence F1, the second reference fence F2 and the third reference fence F3 are also sequentially arranged in the long-axis direction L of the field of view FOV.

In this embodiment, each of the light emitting elements includes an infrared light emitting unit and a lens. Moreover, with the structure of the lenses and the arrangement positions of the infrared light emitting units, the first speckle region R1, the second speckle region R2, the third speckle region R3 and the fourth speckle region R4 can be sequentially arranged in the long-axis direction L of the field of view FOV.

Figure 5:
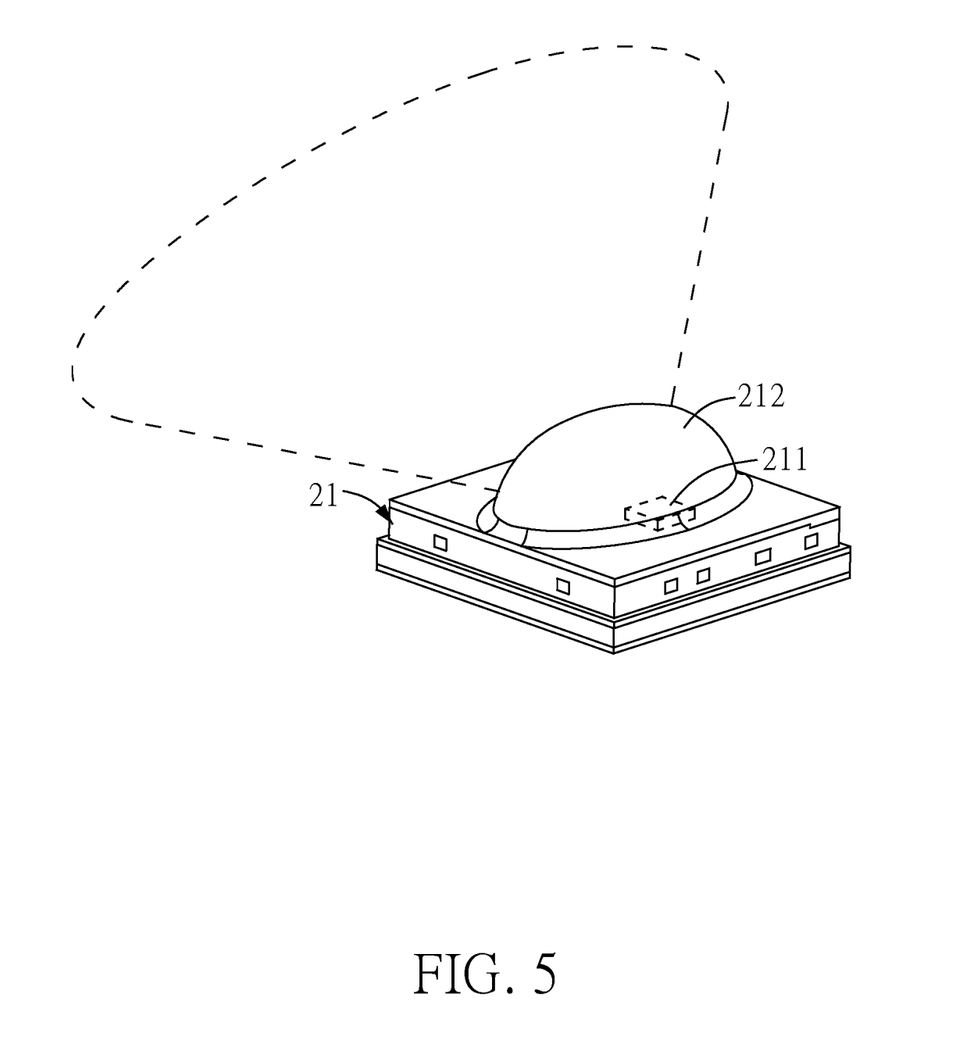
FIG. 5 is an enlarged schematic diagram of a first light emitting element in FIG. 1.

Referring to FIG. 5, FIG. 5 shows an enlarged schematic diagram of the first light emitting element in FIG. 1. Taking the first light emitting element 21 for example, the first light emitting element 21 includes an infrared light emitting unit 211 and a lens 212. Preferably, the lens 212 is a non-spherical lens, which means that a light exit surface of the lens 212 is a non-spherical surface. Specifically, a convex lens commonly used as a light emitting element has a light incident surface as a planar surface and a light exit surface as a spherical surface. In this embodiment, the light incident surface of the lens 212 is similarly a planar surface and faces the infrared light emitting unit 211, and the light exit surface of the lens 212 is, for example, an ellipsoidal surface, or other non-spherical surfaces. The lens 212 having a non-spherical surface can form a speckle region with more concentrated brightness, further providing a more significant brightness difference between the reference fence and the speckle region.

Figure 6A:
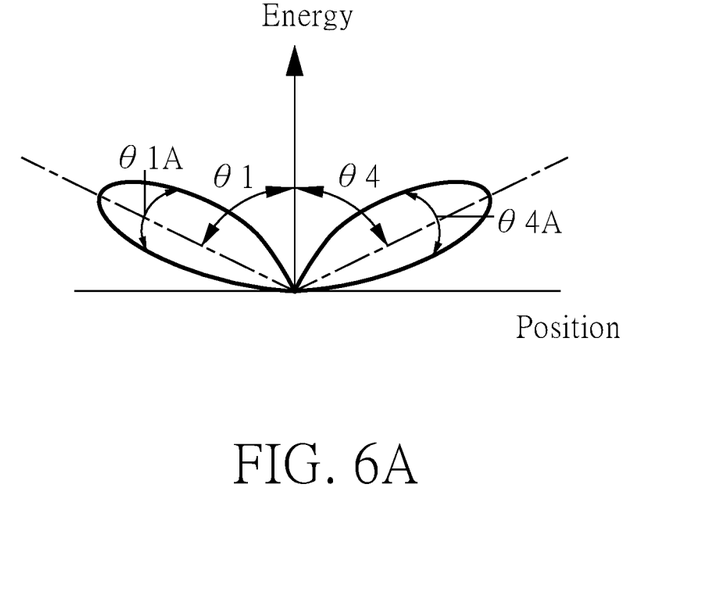
FIG. 6A is a schematic diagram of radiation patterns of a first light emitting element and a fourth light emitting element in FIG. 1.
Figure 6B:
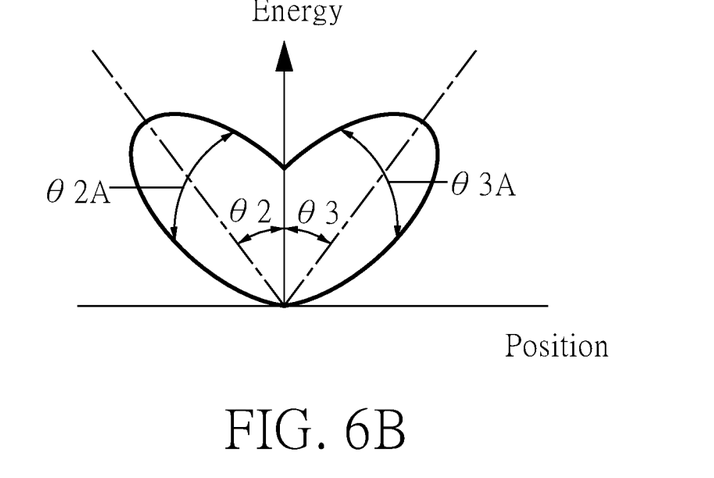
FIG. 6B is a schematic diagram of radiation patterns of a second light emitting element and a third light emitting element in FIG. 1.

FIG. 6A shows a schematic diagram of radiation patterns of the first light emitting element and the fourth light emitting element in FIG. 1, and FIG. 6B shows a schematic diagram of radiation patterns of the second light emitting element and the third light emitting element in FIG. 1. Refer to FIG. 5, and the radiation patterns shown in FIG. 6A and FIG. 6B. With the lens 212 having a non-spherical surface, the first light emitting element 21 generates a non-conical light cone range, that is, a non-symmetrical light cone range, which is referred to as a first light cone range, as indicated by a light cone range on the left of FIG. 6A. It should be noted that, the first light cone range refers to an overall shape of the light emitted from the light exit surface of the lens 212, as indicated by the dotted line in FIG. 5, and the radiation pattern thereof is as indicated on the left of FIG. 6A. The first speckle region R1 in FIG. 4A refers to a wall surface or an area of other objects within the field of view FOV to which the light emitted from the lens 212 projects. The off-axis angle and aperture angle of the light cone range are described with reference to the radiation patterns shown in FIG. 6A and FIG. 6B.

Moreover, the arrangement position of the infrared light emitting unit 211 provides the first light cone range with a predetermined off-axis angle. In other words, in this embodiment, the light emitting elements are caused to generate light cone ranges of different off-axis angles by means of the arrangement positions of the infrared light emitting units. Taking the angle of view of FIG. 5 for example, the infrared light emitting unit 211 of the first light emitting element 21 is arranged on a bottom right edge of the lens 212, so that the first light cone range is formed on the left of the lens 212. It should be noted that, the right of the lens 212 refers to a direction along the X-axis in FIG. 1, and is the side of the lens 212 that is farther away from the central axis of imaging incident light of the image capturing module 10 (that is, the lens). Taking the angle of view of FIG. 1 for example, the first light emitting element 21 in this embodiment is located on top right of the image capturing module 10, the infrared light emitting unit 211 of the first light emitting element 21 is disposed in a biased manner away from the central axis of the imaging incident light of the image capturing module 10 (i.e., the lens), and an off-axis angle θ1 of the first light cone range generated by the first light emitting element 21 is larger, such that the first speckle region R1 is located on the leftmost side of the field of view FOV (as shown in FIG. 4).

Similarly, compared to the infrared light emitting unit 211 of the first light emitting element 21, the infrared light emitting unit (not shown in figures) of the second light emitting element 22 may be arranged close to the center right of the lens of the second light emitting element 22, so that a second light cone range generated by the second light emitting element 22 is located on the left of the light exit surface, and the second speckle region R2 is located on the center left of the field of view FOV (as shown in FIG. 4). In other words, compared to the arrangement position of the infrared light emitting unit 211 of the first light emitting element 21 relative to the lens 212, the infrared light emitting unit of the second light emitting element 22 is closer to the center of the lens compared to the arrangement position of the lens. Taking the angle of view of FIG. 1 for example, the infrared light emitting unit of the second light emitting element 22 in this embodiment is arranged in a biased manner away from the central axis of the imaging incident light of the image capturing module 10.

The infrared light emitting unit (not shown in figures) of the third light emitting element 23 may be arranged close to the center left of the lens of the third light emitting element 23, so that a third light cone range generated by the third light emitting element 23 is located on the right of the light exit surface, and the third speckle region R3 is located on the center right of the field of view FOV (as shown in FIG. 4). The infrared light emitting unit (not shown in figures) of the fourth light emitting element 24 may be arranged on a bottom left edge of the lens of the fourth light emitting element 24, so that a fourth light cone range generated by the fourth light emitting element 24 is located on the right of the light exit surface, and the fourth speckle region R4 is located on the rightmost side of the field of view FOV (as shown in FIG. 4). Taking the angle of view of FIG. 1 for example, the infrared light emitting units of the third light emitting element 23 and the fourth light emitting element 24 in this embodiment are both arranged in a biased manner away from the central axis of the imaging incident light of the image capturing module 10. In sum, with the biased arrangement of the infrared light emitting units (that is, the infrared light emitting units are not arranged at the centers of the lenses), the off-axis angles $\theta 1$ and $\theta 4$ of the first light cone range and the fourth light cone range in this embodiment are greater than the off-axis angles $\theta 2$ and $\theta 3$ of the second light cone range and the third light cone range. Moreover, the first light cone range and the fourth light cone range face opposite directions, and the second light cone range and the third light cone range face opposite directions, so as to form the first speckle region R1, the second speckle region R2, the third speckle region R3 and the fourth speckle region R4 that are sequentially arranged in the field of view FOV.

As shown in FIG. 6A and FIG. 6B, in this embodiment, non-spherical lenses in different shapes are further used to generate light cone ranges of different aperture angles. Specifically, the lens 212 of the first light emitting element 21 and the lens of the fourth light emitting element 24 have the same shape, and can form the first light cone range and the fourth light cone range in a narrower shape. In other words, an aperture angle $\theta 1A$ of the first light cone range and an aperture angle $\theta 4A$ of the fourth light cone range are equal, and the aperture angles $\theta 1A$ and $\theta 4A$ are smaller, as shown in FIG. 6A. Moreover, the lenses of the second light emitting element 22 and the third light emitting element 23 have the same shape, and can form the second light cone range and the third light cone range in a wider shape, as shown in FIG. 6B. In other words, an aperture angle $\theta 2A$ of the second light cone range and an aperture angle $\theta 3A$ of the third light cone range are equal, and the aperture angles $\theta 2A$ and $\theta 3A$ of the second light cone range and the third light cone range are greater than the aperture angles $\theta 1A$ and $\theta 4A$ of the first light cone range and the fourth light cone range.

Moreover, with the biased arrangement of the infrared light emitting units and the structure of the lenses, the four light emitting elements may be arranged on the same printed circuit board (PCB), achieving effects of reduced space and facilitating miniaturization. In this embodiment, the normal line of a board surface of the PCB is parallel to an image-capturing direction of the image capturing module 10, and all of the four light emitting elements are close to the image capturing module 10. According to the biased arrangement of the infrared light emitting units and the shapes of the non-spherical lenses, the first light emitting element 21, the second light emitting element 22, the third light emitting element 23 and the fourth light emitting element 24 are provided. Specifically, the first light emitting element 21 and the second light emitting element 22 can generate the first light cone range and the second light cone range that produce biased irradiation, and thus the first light emitting element 21 and the second light emitting element 22 may be disposed on the upper left of the image capturing module 10. Similarly, the third light emitting element 23 and the fourth light emitting element 24 are disposed on the upper right of the image capturing module 10. Moreover, the first light emitting element 21 and the fourth light emitting element 24 can generate the first light cone range and the fourth light cone range having larger off-axis angles $\theta 1$ and $\theta 4$ and smaller aperture angles $\theta 1A$ and $\theta 4A$. Thus, the first light emitting element 21 and the fourth light emitting element 24 may be disposed above the second light emitting element 22 and the third light emitting element 23, respectively. In other embodiments, the lens of the light emitting element may be a common spherical lens, so a plurality of light emitting elements may be provided by using a plurality of PCBs (for example, each PCB is provided with one light emitting element) in a three-dimensional space. For example but not limited to, four light emitting elements are provided along an inverted-U shape, or a plurality of speckle regions among which two adjacent speckle regions overlap are formed in the field of view FOV.

In step S20, the image capturing module 10 captures and transmits an image of the field of view FOV to the processing module 30.

As described above, the image capturing module 10 in this embodiment is for image capturing or video recording, so as to capture an image of the field of view FOV. The image capturing module 10 transmits the captured image to the processing module 30.

In step S30, the processing module 30 obtains a target position according to a behavior of the target image crossing the reference fence.

The processing module 30 receives the image of the field of view FOV, and then determines whether an organism is present in the field of view FOV according to content of the image. First of all, in this embodiment, the image of an organism (for example, a human body) in the field of view FOV is referred to as a target image. The processing module 30 may determine in which speckle region the target image is located by means of an image recognition technique. In this embodiment, when the target image (that is, the organism) moves in the field of view FOV and the target image crosses the reference fence, the processing module 30 may detect a reflection of darkness, brightness and darkness, so that in which speckle region the target image is located can be further determined, and this is referred to as a target position in this embodiment.

For example, when the target image sequentially passes through the first speckle region R1, the first reference fence F1 and the second speckle region R2 (that is, crossing the first reference fence F1) shown in FIG. 4, the processing module 30 can detect reflection signals that are sequentially dark, bright and dark from the left side of the field of view FOV, and can further determine that the target image is located in the second speckle region R2. That is, the target position is the second speckle region R2.

In other words, with the reference fence with higher brightness formed by two adjacent partially overlapping speckle regions, the processing module 30 is allowed to detect a movement effect of crossing the reference fence, and to use this characteristic to determine the target position.

In addition, a common traveling direction of an organism (in particular, a human body) moves in the long-axis direction L of the field of view FOV. The first reference fence F1, the second reference fence F2 and the third reference fence F3 in this embodiment are sequentially arranged in the long-axis direction L of the field of view FOV, so that the processing module 30 can more accurately determine the position of an organism (in particular, a human body).

In step S40, the processing module 30 adjusts brightness of the light emitting elements according to the target position.

After the processing module 30 determines the target position of the organism, the processing module 30 can then adjust brightness of the light emitting elements according to the target position. The processing module 30 may increase the brightness of one of the light emitting elements corresponding to the speckle region where the target position is located, or the processing module 30 may decrease the brightness of the light emitting elements corresponding to the speckle regions adjacent to the target position.

In continuation from the foregoing example, after the processing module 30 determines that the organism is located in the second speckle region R2 (that is, the target position), the processing module 30 may increase the brightness of the second light emitting element 22 corresponding to the second speckle region R2, or may decrease the brightness of the first light emitting element 21 and the third light emitting element 23 corresponding to the adjacent first speckle region R1 and third speckle region R3. In this embodiment, the processing module 30 may increase a driving current of the second light emitting element 22 so as to increase the brightness of the second light emitting element 22. Moreover, the processing module 30 may also decrease driving currents of the first light emitting element 21 and the third light emitting element 23, so as to weaken the brightness of the first light emitting element 21 and the third light emitting element 23. In other words, brightness of the second speckle region R2 where the organism is located is reinforced in order to prevent the issue of insufficient brightness. In addition, the brightness of the first speckle region R1 and the third speckle region R3 that are non-target positions is weakened, so as to prevent the issue of over-exposure. Thus, in this embodiment, the center and edges of the field of view FOV are illuminated in a partitioned manner by a plurality of light emitting elements (step S10), and the brightness of the light emitting elements corresponding to the speckle regions is then independently controlled by the processing module 30 according to the target position. That is, the function of independently controlling the brightness of individual speckle regions can be achieved.

Figure 7:
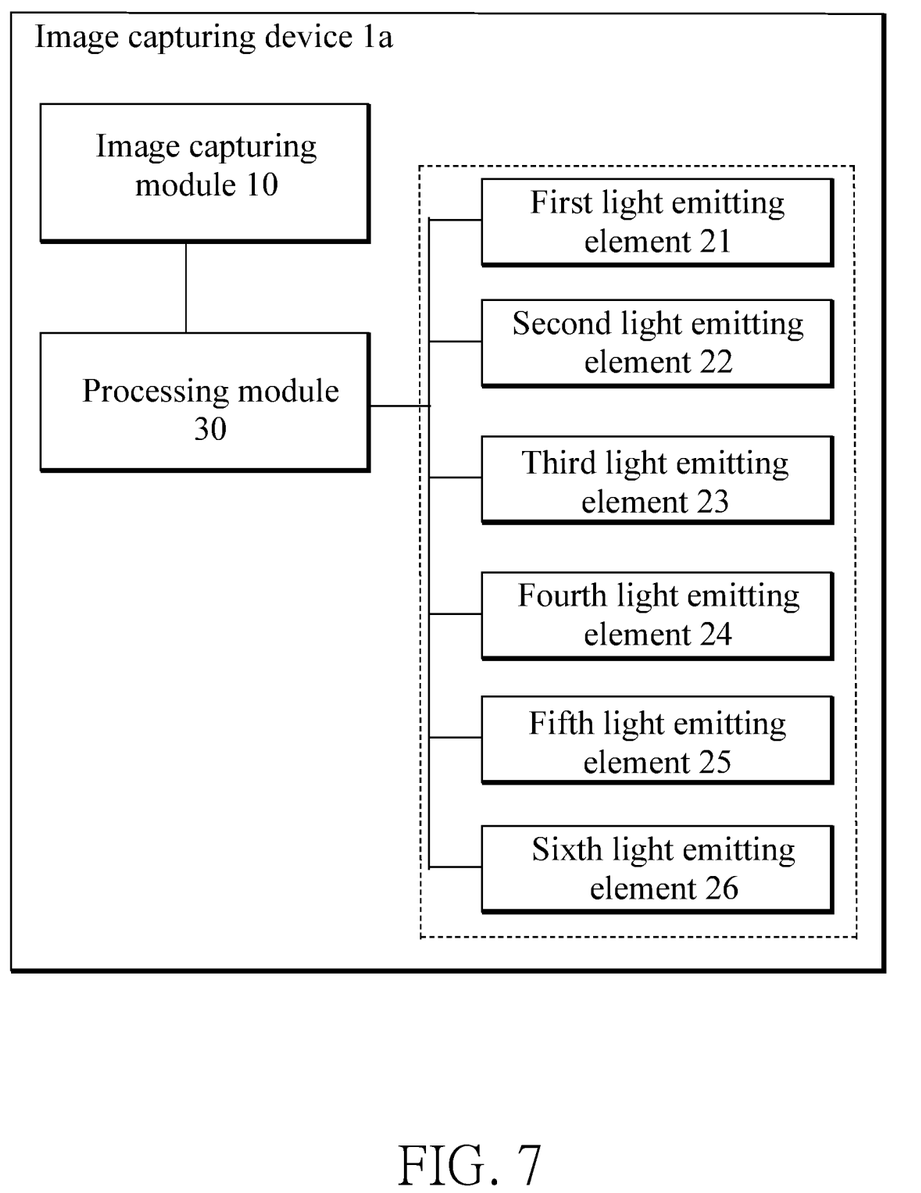
FIG. 7 is a block diagram of an image capturing device according to another embodiment of the present disclosure.
Figure 8:
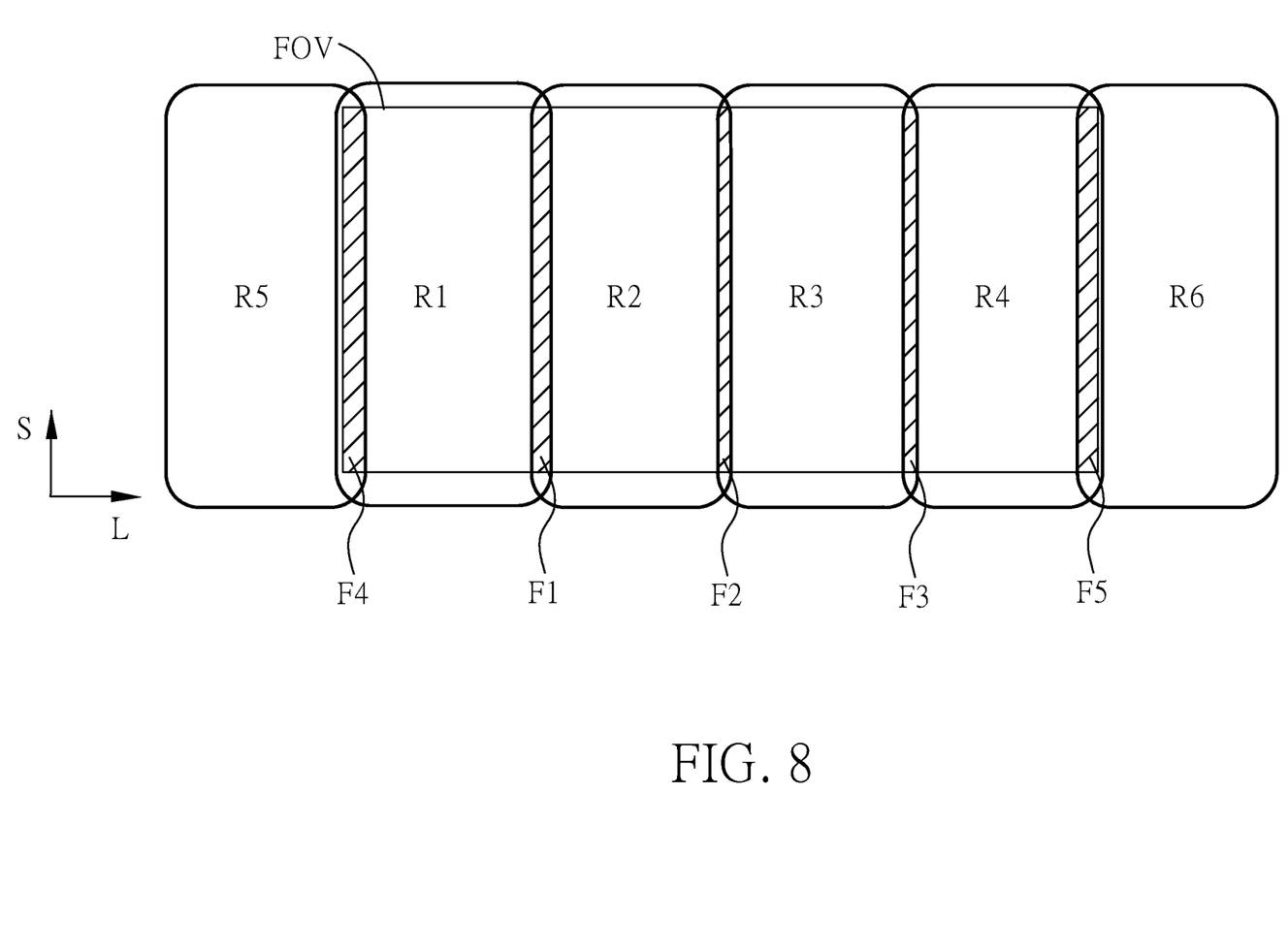
FIG. 8 is a schematic diagram of a field of view captured by the image capturing module in FIG. 7.

Referring to FIG. 7 and FIG. 8, FIG. 7 shows a block diagram of an image capturing device according to another embodiment of the present disclosure, and FIG. 8 shows a schematic diagram of a field of view captured by the image capturing module in FIG. 7. An image capturing device 1a of this embodiment differs from the image capturing device 1 of the foregoing embodiment in respect of two additional light emitting elements, so that speckle regions can be formed on an outer side and an edge of the field of view FOV to enhance the processing module 30. Specifically, in this embodiment, the light emitting elements are in a quantity of six, which are respectively the first light emitting element 21, the second light emitting element 22, the third light emitting element 23, the fourth light emitting element 24, a fifth light emitting element 25 and a sixth light emitting element 26. The fifth light emitting element 25 and the sixth light emitting element 26 are additional light emitting elements in this embodiment, and the structures of the infrared light emitting units and the lenses may refer to the description associated with the infrared light emitting unit 211 and the lens 212 of the first light emitting element 21 above, and such repeated details are omitted herein.

In this embodiment, the infrared light emitting unit (not shown) of the fifth light emitting element 25 may be disposed on a bottom right edge of the lens of the fifth light emitting element 25, so that a speckle generated by the fifth light emitting element 25 is located on the left of the light exit surface of the lens of the fifth light emitting element 25. Compared to the arrangement position of the infrared light emitting unit 211 of the first light emitting element 21 relative to the lens 212, the infrared light emitting unit of the fifth light emitting element 25 is farther away from the center of the lens compared to the arrangement position of the lens. Similarly, the infrared light emitting unit (not shown in figures) of the sixth light emitting element 26 may be disposed on a bottom left edge of the lens of the sixth light emitting element 26, so that a speckle generated by the sixth light emitting element 26 is located on the right of the light exit surface of the lens of the sixth light emitting element 26. Compared to the arrangement position of the infrared light emitting unit of the fourth light emitting element 24 relative to the lens, the infrared light emitting unit of the sixth light emitting element 26 is farther away from the center of the lens compared to the arrangement position of the lens.

The fifth light emitting element 25 and the sixth light emitting element 26 have infrared light emitting units in a biased arrangement and lenses in non-spherical shapes. The fifth light emitting element 25 is disposed on the upper left of the image capturing module 10, and the sixth light emitting element 26 is disposed on the upper right of the image capturing module 10. Moreover, the fifth light emitting element 25 can generate a light cone range having an off-axis angle greater than the off-axis angle $\theta 1$ and an aperture angle smaller than the aperture angle $\theta 1A$. The sixth light emitting element 26 can generate a light cone range having an off-axis angle greater than the off-axis angle $\theta 4$ and an aperture angle smaller than the aperture angle $\theta 4A$. The light cone ranges generated by the fifth light emitting element 25 and the sixth light emitting element 26 face opposite directions.

In this embodiment, the fifth light emitting element 25 and the sixth light emitting element 26 form a fifth speckle region R5 and a sixth speckle region R6 on an outer side and an edge of the field of view FOV, respectively. The fifth speckle region R5 is located on the left of the first speckle region R1, and the fifth speckle region R5 and the first speckle region R1 partially overlap to form a fourth reference fence F4. Moreover, the sixth speckle region R6 is located on the right of the fourth speckle region R4, and the sixth speckle region R6 and the fourth speckle region R4 partially overlap to form a fifth reference fence F5. Similarly, the fourth reference fence F4, the first reference fence F1, the second reference fence F2, the third reference fence F3 and the fifth reference fence F5 are sequentially arranged in the long-axis direction L of the field of view FOV.

The fourth reference fence F4 and the fifth reference fence F5 are formed on the left edge and the right edge of the field of view FOV, respectively. When an organism enters the field of view FOV from the outside of the field of view FOV, for example, crossing the fourth reference fence F4 and entering the first speckle region R1, the processing module 30 can detect reflection signals that are sequentially bright and dark from the left of the field of view FOV, and can further determine that the target image is located in the first speckle region R1, so as to enhance the precision of the processing module 30 in the determination for the target position.

Figure 9:
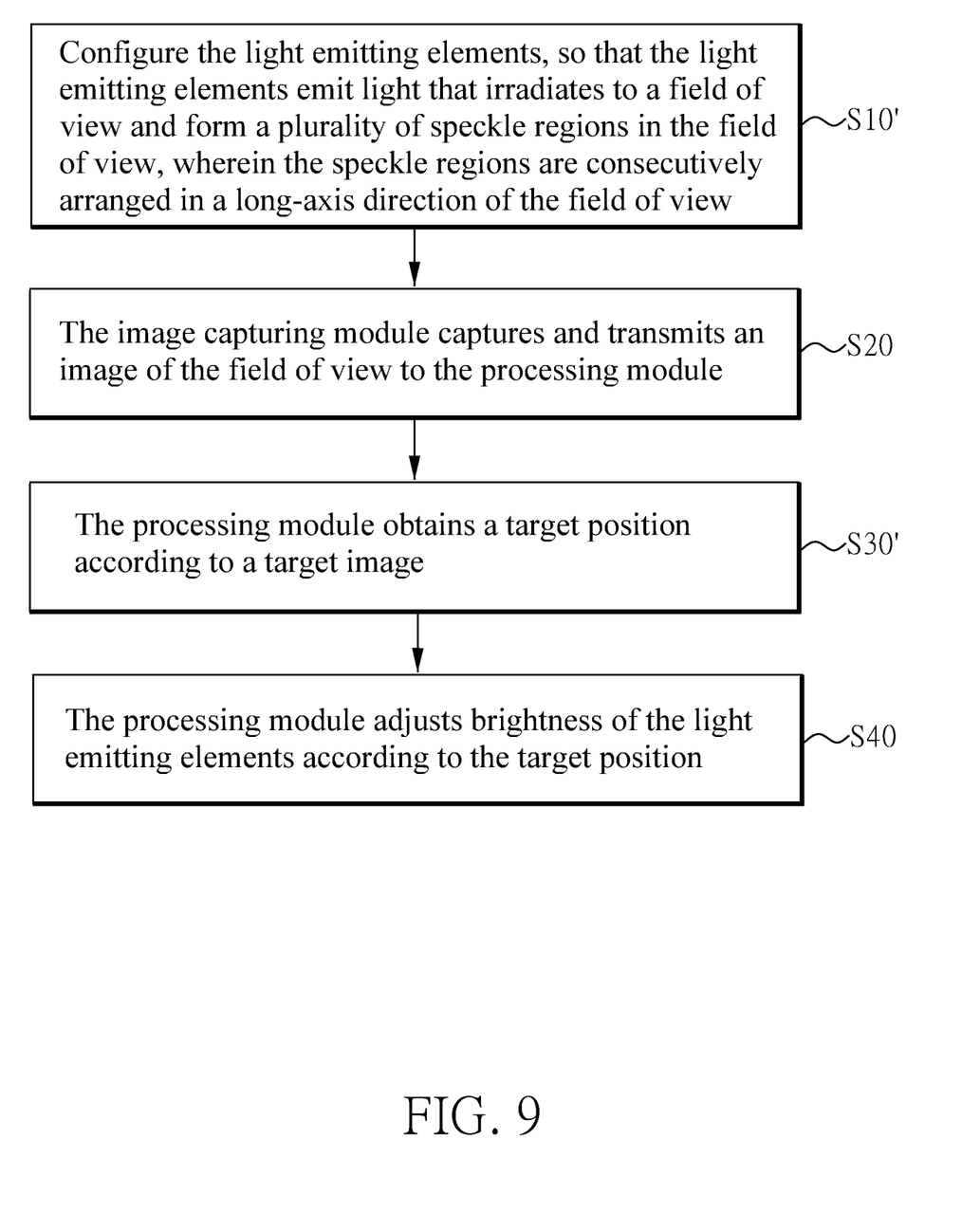
FIG. 9 is a flowchart of steps of an image capturing method according to another embodiment of the present disclosure.

FIG. 9 shows a flowchart of steps of an image capturing method according to another embodiment of the present disclosure. First of all, the image capturing method of this embodiment can be applied to the image capturing device 1 or 1a in FIG. 1 or FIG. 7, and the description is given by taking an application to the image capturing device 1 in FIG. 1 as an example. Refer to FIG. 1 and FIG. 9. Moreover, the image capturing method of this embodiment includes: configuring the light emitting elements so that the light emitting elements emit light that irradiates to the field of view FOV, and forming a plurality of speckle regions in the field of view FOV, wherein the speckle regions are consecutively arranged in the long-axis direction L of the field of view FOV (step S10'); the image capturing module 10 capturing and transmitting an image of the field of view FOV to the processing module 30 (step S20); the processing module 30 obtaining a target position according to a target image (step S30'); and the processing module 30 adjusting brightness of the light emitting elements according to the target position (step S40). The image capturing method of this embodiment differs from the foregoing embodiment in step S10' and step S30', and details of step S20 and step S40 may refer to the foregoing embodiment.

Similar to the foregoing embodiment, the first light emitting element 21, the second light emitting element 22, the third light emitting element 23 and the fourth light emitting element 24 can form the first speckle region R1, the second speckle region R2, the third speckle region R3 and the fourth speckle region R4 (step S10'). With the biased arrangement of the infrared light emitting units and the shapes of the non-spherical lenses of the individual light emitting elements, the first speckle region R1, the second speckle region R2, the third speckle region R3 and the fourth speckle region R4 can be consecutively arranged in the field of view FOV, and preferably sequentially arranged in the long-axis direction L of the field of view FOV. The details of the positions of the infrared light emitting units and the shapes of the non-spherical lenses in the first light emitting element 21, the second light emitting element 22, the third light emitting element 23 and the fourth light emitting element 24 can refer to the description of the embodiments above, and are thus omitted herein.

In step S30', after receiving the image of the field of view FOV, the processing module 30 can first determine whether an organism is present in the field of view FOV according to content of the image. In this embodiment, an image of the organism (for example, a human body) in the field of view FOV is referred to as a target image, and the processing module 30 may determine in which speckle region the target image is located by an image recognition technique, and this referred to as a target position in this embodiment. The details of the image recognition technique are generally known to a person skilled in the art and are not the focus for improvement in the present disclosure, and are thus omitted herein. The details for adjusting the brightness of the light emitting elements in step S40 can also directly refer to the foregoing embodiment.

In this embodiment, a plurality of light emitting elements (i.e., the first light emitting element 21, the second light emitting element 22, the third light emitting element 23 and the fourth light emitting element 24) are disposed around the image capturing module 10, and a plurality of speckle regions (i.e., the first speckle region R1, the second speckle region R2, the third speckle region R3 and the fourth speckle region R4) sequentially arranged can be formed in the field of view FOV. In other words, the plurality of light emitting elements illuminate the center and edge of the field of view FOV in a partitioned manner (preferably illuminating along the long-axis direction L in a partitioned manner) (step S10'). By means of the partitioned illumination, the function of independently controlling the brightness of individual speckle regions can then be achieved subsequently, further preventing insufficient brightness and over-exposure at the center and the edge of the field of view FOV (step S10'). By means of the partitioned illumination, the function of independently controlling the brightness of individual speckle regions can then be achieved subsequently, and insufficient brightness and over-exposure can further be prevented.

In conclusion, according to the image capturing device and method of the present disclosure configured with the plurality of light emitting elements, the light emitting elements form a plurality of speckle regions in the field of view, and the speckle regions are consecutively arranged in the field of view. In other words, the plurality of light emitting elements illuminate the center and edge of the field of view in a partitioned manner. Moreover, after the processing module determines the target position, the processing module can also independently control the brightness of the light emitting elements corresponding to the speckle regions according to the target position, that is, brightness can be controlled in a partitioned manner so as to achieve effect of preventing over-exposure or insufficient brightness.

It is noted that the above-described embodiments are merely illustrative of preferred embodiments of the present disclosure, and that in order to prevent redundancy, not all possible combinations of the variations are described in detail; various changes and modifications may be made to the described embodiments without departing from the scope of the disclosure as described by the appended claims.

What is claimed is:

1. An image capturing device, comprising:
   an image capturing module, capturing an image of a field of view;
   a plurality of light emitting elements, emitting light that irradiates to the field of view, and forming a plurality of speckle regions in the field of view, wherein the speckle regions are consecutively arranged in the field of view, wherein two adjacent regions of the speckle regions partially overlap to form at least one reference fence having higher brightness; and
   a processing module, electrically connected to the image capturing module and the light emitting elements, receiving the image of the field of view from the image capturing module, the processing module obtaining a target position according to a behavior of a target image crossing the reference fence and adjusting brightness of the light emitting elements according to the target position.

2. The image capturing device according to claim 1, wherein the processing module increases brightness of one of the light emitting elements corresponding to the target position.

3. The image capturing device according to claim 1, wherein each of the light emitting elements comprises an infrared light emitting unit and a lens.

4. The image capturing device according to claim 3, wherein the lens is a non-spherical lens.

5. The image capturing device according to claim 1, wherein the light emitting elements are in a quantity of four, which are respectively a first light emitting element, a second light emitting element, a third light emitting element and a fourth light emitting element, and form a first speckle region, a second speckle region, a third speckle region and a fourth speckle region in the field of view, respectively, and the first speckle region, the second speckle region, the third speckle region and the fourth speckle region are sequentially arranged in a long-axis direction of the field of view.

6. The image capturing device according to claim 5, wherein the first light emitting element generates a first light cone range, the second light emitting element generates a second light cone range, the third light emitting element generates a third light cone range, the fourth light emitting element generates a fourth light cone range, and off-axis angles of the first light cone range and the fourth light cone range are greater than off-axis angles of the second light cone range and the third light cone range.

7. The image capturing device according to claim 6, wherein the first light cone range and the fourth light cone range face opposite directions, and the second light cone range and the third light cone range face opposite directions.

8. The image capturing device according to claim 6, wherein aperture angles of the first light cone range and the fourth light cone range are greater than aperture angles of the second light cone range and the third light cone range.

9. The image capturing device according to claim 5, wherein the first speckle region and the second speckle region partially overlap to form a first reference fence, the second speckle region and the third speckle region partially overlap to form a second reference fence, the third speckle region and the fourth speckle region partially overlap to form a third reference fence, and the first reference fence, the second reference fence and the third reference fence are sequentially arranged in the long-axis direction of the field of view.

10. The image capturing device according to claim 9, wherein the light emitting elements are in a quantity of six, which are respectively the first light emitting element, the second light emitting element, the third light emitting element, the fourth light emitting element, a fifth light emitting element and a sixth light emitting element, the fifth light emitting element and the sixth light emitting element from a fifth speckle region and a sixth speckle region on an outer side and an edge of the field of view, respectively, the fifth speckle region and the first speckle region partially overlap to form a fourth reference fence, and the sixth speckle region and the fourth speckle region partially overlap to form a fifth reference fence.

11. An image capturing method, applied to an image capturing device, the image capturing device comprising an image capturing module, a plurality of light emitting elements and a processing module, the image capturing method comprising the steps of:
configuring the plurality of light emitting elements, so that the light emitting elements emit light that irradiates to a field of view and form a plurality of speckle regions in the field of view, wherein the speckle regions are consecutively arranged in the field of view, wherein two adjacent regions of the speckle regions partially overlap to form at least one reference fence with higher brightness;
the image capturing module capturing and transmitting an image of the field of view to the processing module;
the processing module obtaining a target position according to a behavior of a target image crossing the reference fence; and
the processing module adjusting brightness of the light emitting elements according to the target position.

12. The image capturing method according to claim 11, wherein the processing module increases brightness of one of the light emitting elements corresponding to the target position.

13. The image capturing method according to claim 11, wherein the light emitting elements are in a quantity of four, which are respectively a first light emitting element, a second light emitting element, a third light emitting element and a fourth light emitting element, and form a first speckle region, a second speckle region, a third speckle region and a fourth speckle region in the field of view, respectively, and the first speckle region, the second speckle region, the third speckle region and the fourth speckle region are sequentially arranged in a long-axis direction of the field of view.

14. The image capturing method according to claim 13, wherein the first light emitting element generates a first light cone range, the second light emitting element generates a second light cone range, the third light emitting element generates a third light cone range, the fourth light emitting element generates a fourth light cone range, and off-axis angles of the first light cone range and the fourth light cone range are greater than off-axis angles of the second light cone range and the third light cone range.

15. The image capturing method according to claim 14, wherein the first light cone range and the fourth light cone range face opposite directions, and the second light cone range and the third light cone range face opposite directions.

16. The image capturing method according to claim 14, wherein aperture angles of the first light cone range and the fourth light cone range are greater than aperture angles of the second light cone range and the third light cone range.

17. The image capturing method according to claim 13, wherein the first speckle region and the second speckle region partially overlap to form a first reference fence, the second speckle region and the third speckle region partially overlap to form a second reference fence, the third speckle region and the fourth speckle region partially overlap to form a third reference fence, and the first reference fence, the second reference fence and the third reference fence are sequentially arranged in the long-axis direction of the field of view.

18. The image capturing method according to claim 17, wherein the light emitting elements are in a quantity of six, which are respectively the first light emitting element, the second light emitting element, the third light emitting element, the fourth light emitting element, a fifth light emitting element and a sixth light emitting element, the fifth light emitting element and the sixth light emitting element form a fifth speckle region and a sixth speckle region on an outer side and an edge of the field of view, respectively, the fifth speckle region and the first speckle region partially overlap to form a fourth reference fence, and the sixth speckle region and the fourth speckle region partially overlap to form a fifth reference fence.

* * * * *